UNITED STATES PATENT OFFICE.

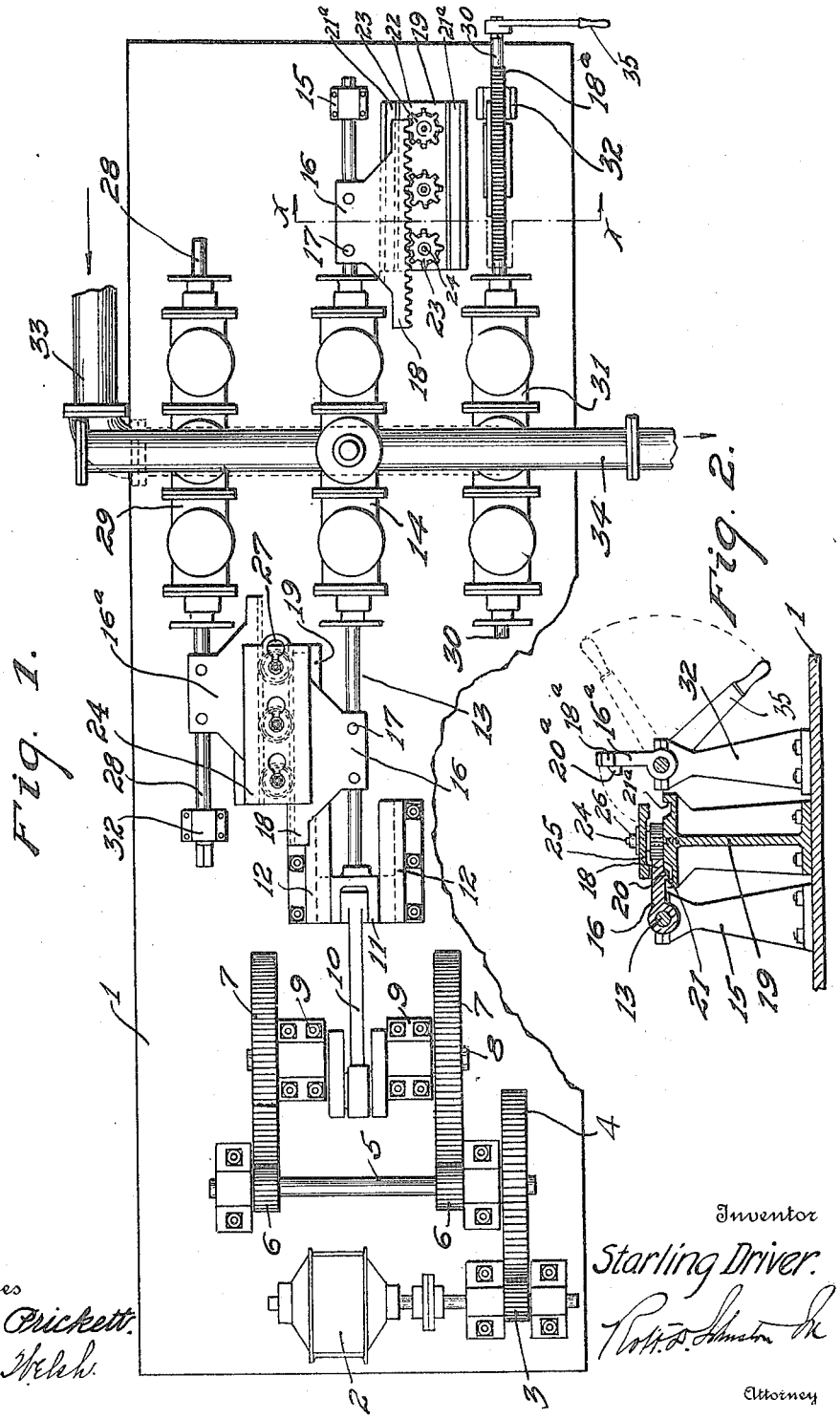

STARLING DRIVER, OF BIRMINGHAM, ALABAMA.

HYDRAULIC PUMP.

1,123,712. Specification of Letters Patent. Patented Jan. 5, 1915.

Application filed March 5, 1914. Serial No. 822,727.

*To all whom it may concern:*

Be it known that I, STARLING DRIVER, a citizen of the United States of America, residing at Birmingham, in the county of Jefferson and State of Alabama, have invented certain new and useful Improvements in Hydraulic Pumps, of which the following is a specification.

My invention relates to hydraulic pumps and my object is to provide a pumping apparatus comprising a plurality of pump units, one or more or all of which are adapted to be driven by a common motor.

One object of my invention is to so couple one or more of these pump units to the motor as to permit it or them to be quickly and easily cut out of service without stopping the motor or the operation of the pump or pumps, and this feature of my invention provides in a simple and effective manner not only to regulate the output of the pumping apparatus as a whole without changing the speed of its driving motor, but also to permit any pump unit to be quickly and easily cut out of service and repaired without in the least interfering with the effective operation of the other pump units.

My invention is particularly adapted for use in mines where it is desirable to have the simplest possible driving mechanism for pumps which should have a widely varying capacity and in which it is naturally of importance that the pumping apparatus, as a whole, should operate with a maximum of efficiency for widely varying capacities.

My invention further comprises the details of construction and arrangements of parts which are shown in the accompanying drawings that form a part of this specification, and in which:—

Figure 1 is a plan view of the pumping apparatus having three independent pump units driven by a common connecting rod, one pump being shown disconnected from the driving mechanism and the drive means for operating it being shown in plan with the top cover removed. Fig. 2 is a vertical cross section taken on the line $x$—$x$ of Fig. 1.

Similar reference numerals refer to similar parts throughout the drawings.

I have shown the pumping apparatus mounted on a base 1 and comprising an electric motor 2 driving a pinion 3 which transmits motion through the gear wheel 4 to a countershaft 5 having at each end thereof pinions 6 meshing each with a large gear wheel 7. These gear wheels 7 are fast on each end of a crank shaft 8 mounted in bearings 9. A connecting rod 10 acts to drive a cross head 11 which reciprocates in suitable guide bearings 12. All this driving mechanism is of standard design and construction and may be widely varied without departure from my invention.

To the cross head 11 I connect a single piston rod 13 which passes directly through the main or central pipe 14 and is mounted at its outer end in a bearing 15. It will be noted that I space the bearings 12 and 15 from the pump 14 and my object in so doing is to provide for the connection of a rack plate 16 at each end of the piston rod 13. These plates are securely riveted to or made fast on the piston rod 13 by bolts or rivets 17. These plates flare outwardly toward, and terminate in, racks 18 which stand parallel with piston rod 13. The rack plates 16 are normally mounted to slide on bearings 19 and each plate has depending from its under face a bearing lug 20 with an inwardly facing vertical bearing face in sliding engagement with a vertical bearing face 21 on its respective bearing 19.

A bearing 19 is shown in Fig. 2 in cross section and it will be noted that it has a raised central portion 22 and on each side of this it is longitudinally grooved to form a bearing face 21 on one side and on its other side a similar but reversely facing bearing face 21$^a$.

A rack plate 16$^a$, which is preferably a duplicate of the plates 16, has a bearing lug 20$^a$, similar to the lug 20, and it will be noted that I provide one of these rack plates for each bearing 19 with its rack 18$^a$ disposed opposite one of the racks 18.

Mounted on the central portion 22 of each bearing 19 are a series of pinions 23 journaled on stud bearings 24 that are screwed down into the base and have each of their upper threaded ends adapted to project through a top cover plate 25 and to receive a nut 26. The top plate for each bearing 19 is preferably provided with bayonet slots 27, one for each stud 24, and these slots being sufficiently large to permit the plates to be slipped over the nuts 26 and shifted to the right to interlock under them, after which the nuts are tightened to draw the plate downwardly until its under side bearing faces engage the oppositely disposed racks 16 and 16ª and hold them in mesh with the interposed pinions 24.

The construction which I have described is similar for the transmission means at each end of the piston rod 13. One rack 18ª is connected to and serves to drive the piston rod 28 for a pump 29 disposed on one side of pump 14, and the other rack 18ª serves to drive the piston rod 30 for a pump 31 which is disposed on the opposite side of pump 14 from the pump 29. These piston rods reciprocate in bearings 32. The several pumps 14, 29 and 31 are arranged for their pistons to travel in parallelism and the pumps may be of any suitable type. The several pumps are preferably connected to a common intake pipe 33 and deliver the water to a common outlet pipe 34.

When it is desired to disconnect either pump 29 or 31, to cut it out of service, it is only necessary to slightly loosen the nuts 26 above the cover plate of its respective bearing 19, shift the plate to the left and lift it off, after which the rack plate 16, which is connected to the piston rod of the pump to be disconnected, can be swung up out of engagement with the pinions 23, as shown in the case of the rack 18ª for the pump 31. The end of the piston rod is preferably squared to receive a wrench or tool 35 by which the piston rod and rack can be more easily turned.

In operation, the power from the motor is transmitted directly to the central pump 14 and operates it in the usual manner, but, by means of the rack plates 16, pinions 23 and rack plates 16ª, the piston rod 13 of pump 14 is adapted to reciprocate the piston rods 28 and 30 of pumps 29 and 31, respectively, and thereby to operate simultaneously the several pumps of the pumping apparatus and thereby obtain the maximum capacity of the pumping apparatus, but should either pump element require repair or should it be desired to reduce the capacity of the pumping apparatus without changing its efficient speed of operation, one or both of the pumps 29 or 31 can be cut out of service in the manner described.

While I prefer to utilize the motion transmission means which I have shown for operating the side pumps from the center pump, other equivalent motion transmission means may be employed which are readily disconnectible for the purposes described.

Without limiting myself to the details of construction shown and described, what I claim as new and desire to secure by Letters Patent, is:—

1. In a pumping apparatus, in combination a plurality of independent pumps disposed in parallelism, piston rods for said pumps, a motor driven cross head direct connected to the piston rod of one pump, and disconnectible motion transmission means which indirectly connect said cross head to the piston rod or rods of the other pump or pumps, substantially as described.

2. In a pumping apparatus of the character described, in combination a plurality of pumps disposed in parallelism, a power driven cross head disposed opposite the intermediate pump, a piston rod for said intermediate pump which is direct connected to the cross head, piston rods for the pumps on each side of said central pump, and disconnectible motion transmission means which are driven from said cross head and which reciprocate the piston rods for the side pumps, substantially as described.

3. In a pump of the character described, in combination a power driven reciprocatory cross head and an elongated piston rod connected thereto, a pump operated by said piston rod, one or more auxiliary pumps having piston rods, and a rack and pinion transmission means for driving the piston rods of the auxiliary pumps from said cross head, substantially as described.

4. In combination, a plurality of independent parallel pumps having each a piston rod, a single power driven cross head which is direct connected to the piston rod of one pump, a rack driven by said cross head, a rack connected to the piston rod of another pump, and pinion means to transmit motion between said racks, one of said racks being movable to disengage it from said pinions, substantially as described.

5. A pumping apparatus comprising in combination a power driven cross head, a main pump having a piston rod direct connected to said cross head and projecting through and beyond said pump, a rack connected to said piston rod on each side of said pump, an auxiliary pump disposed on each side of the first mentioned pump, a piston rod for each auxiliary pump, a rack connected to each auxiliary pump piston rod, bearings at each end of the main pump which support said several racks, and pinions mounted on said bearings and meshing with racks on the main and auxiliary pump piston rods to transmit motion through said racks and drive the auxiliary pumps with the main pump, substantially as described.

6. In a pumping apparatus, in combination, a reciprocating power driven element, one pump having a piston rod driven by said element, another pump having a piston rod, racks connected to said piston rods, a bearing in which said racks are slidably mounted, one or more pinions rotatably mounted in said bearing and meshing with said racks, one of said racks being adapted to be swung about its piston as a center and disengaged from said bearing and pinions, and a removable member to the bearing which holds said racks in operative relationship with said pinions, substantially as described.

In testimony whereof I affix my signature in presence of two witnesses.

STARLING DRIVER.

Witnesses:
J. SMITH,
NOMIE WELSH.

Copies of this patent may be obtained for five cents each, by addressing the "Commissioner of Patents, Washington, D. C."